US011436220B1

(12) United States Patent
Conrad et al.

(10) Patent No.: US 11,436,220 B1
(45) Date of Patent: Sep. 6, 2022

(54) AUTOMATED, CONFIGURABLE AND EXTENSIBLE DIGITAL ASSET CURATION TOOL

(71) Applicant: Microsoft Technology Licensing, LLC, Redmond, WA (US)

(72) Inventors: Jeffrey Paul Conrad, Bothell, WA (US); Raymond Robert Ringhiser, Maple Valley, WA (US); Jayasudha Thota, Bellevue, WA (US); Gabriele Masili, Mercer Island, WA (US); Ravikumar Venkata Seetharama Bandaru, Harrow (GB); Siobhan Jane Flanigan, Portland, OR (US); Dennis Michael Pollett, Redmond, WA (US); Daoquan Chen, Shanghai (CN); Robert O'Brien, Langley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/197,263

(22) Filed: Mar. 10, 2021

(51) Int. Cl.
*G06F 16/00* (2019.01)
*G06F 16/242* (2019.01)
(Continued)

(52) U.S. Cl.
CPC .......... *G06F 16/2428* (2019.01); *G06F 16/41* (2019.01); *G06F 16/435* (2019.01); *G06F 16/48* (2019.01)

(58) Field of Classification Search
CPC ...... G06F 16/685; G06F 16/16; G06F 16/639; G06F 16/632; G06F 16/686
See application file for complete search history.

(56) References Cited

U.S. PATENT DOCUMENTS 8,136,142 B2   3/2012  Alexander et al.
9,158,559 B2  10/2015  Simmons et al.
(Continued)

OTHER PUBLICATIONS

"50 best content curation tools", Retrieved from: https://sharethis.com/best-practices/social-sharing/2019/10/50-best-content-curation-tools/, Oct. 18, 2019, 22 Pages.
(Continued)

*Primary Examiner* — Cheryl Lewis
(74) *Attorney, Agent, or Firm* — NovoTechIP International PLLC

(57) ABSTRACT

In a data asset curating system including a processor, computer-readable medium and data storage storing source data assets, each source data asset including content data and source metadata, the data storage stores instructions causing the system to perform converting, based on a conversion rule defining a set of standard attributes, the source data assets to curatable data assets, each curatable data asset including the content data of the corresponding source data asset and curatable metadata, the curatable metadata including one or more standard attributes; causing a user device to render a GUI configured to provide filtering options for querying the curatable data assets; receiving, from the user device, a curation query including a set of the filtering options selected via the GUI; and identifying, from the curatable data assets, a set of the curatable data assets satisfying the received curation query.

20 Claims, 10 Drawing Sheets

(51) Int. Cl.
  *G06F 16/48*   (2019.01)
  *G06F 16/435*  (2019.01)
  *G06F 16/41*   (2019.01)

(56) References Cited

U.S. PATENT DOCUMENTS

| | | |
|---|---|---|
| 9,524,340 B1 | 12/2016 | Garthwaite et al. |
| 9,628,551 B2 | 4/2017 | Bhamidipaty et al. |
| 10,033,808 B2 | 7/2018 | Simmons et al. |
| 2007/0050467 A1 | 3/2007 | Borrett et al. |
| 2016/0037217 A1 | 2/2016 | Harmon et al. |
| 2016/0205163 A1 | 7/2016 | Patel |
| 2017/0060872 A1* | 3/2017 | Sacheti ............. G06F 16/24578 |
| 2017/0161292 A1 | 6/2017 | Sever et al. |
| 2018/0121420 A1 | 5/2018 | Onusko |
| 2018/0144067 A1 | 5/2018 | Chatelain et al. |
| 2019/0034813 A1* | 1/2019 | Das ........................ G06N 5/046 |
| 2019/0286676 A1 | 9/2019 | Fatzinger |
| 2020/0034357 A1* | 1/2020 | Panuganty ............ G06F 16/248 |
| 2020/0110943 A1* | 4/2020 | Gunawardena ..... G06F 16/7328 |
| 2020/0183930 A1* | 6/2020 | Das ........................ G06N 20/00 |
| 2020/0278997 A1* | 9/2020 | Lamere ................. G06F 16/632 |

OTHER PUBLICATIONS

"Digital Asset Management Feature Overview", Retrieved from: https://web.archive.org/web/20200923170151/https:/www.tweak.com/feature/digital-asset-management, Sep. 23, 2020, 4 Pages.

"International Search Report and Written Opinion Issued in PCT Application No. PCT/US22/017398", dated Apr. 12, 2022, 11 Pages.

* cited by examiner

FIG. 5C

AUTOMATED, CONFIGURABLE AND EXTENSIBLE DIGITAL ASSET CURATION TOOL

BACKGROUND

With the recent development and advancement of information technology (IT), it has become a common practice for people to go online and perform searches when they have a question or want to learn more about a topic or issue. Over the last few decades, numerous entities and individuals have contributed to creation and accumulation of various information available online. As a result, the Internet has become a gigantic sea of information, and thus it becomes more and more difficult for users to locate relevant information. This situation is aggravated by an excessive amount of content on numerous subjects and topics accumulated that has arisen over time with no or very little concern on how relevant or meaningful the content would remain or become over time. As such, there are significant areas for new and improved implementations of technology for managing a large volume of content data that may have accumulated over time.

SUMMARY

In an implementation, a system for curating a plurality of data assets includes a data storage storing a plurality of source data assets, each source data asset including content data and source metadata associated with the content data; a processor; and a computer-readable medium in communication with the processor and storing instructions that, when executed by the processor, cause the processor to control the system to perform converting, based on a conversion rule defining a set of standard attributes, the plurality of source data assets to a plurality of curatable data assets, each curatable data asset including the content data of the corresponding source data asset and curatable metadata converted from the source metadata of the corresponding source data asset, the curatable metadata including one or more standard attributes; causing a user device to render a graphical user interface (GUI) configured to provide a plurality of filtering options for querying the plurality of curatable data assets, each filtering option related to at least one of the set of the standard attributes; receiving, from the user device, a curation query including a set of the filtering options selected via the GUI; and identifying, from the plurality of curatable data assets, a set of the curatable data assets satisfying the received curation query.

In another implementation, a method of operating a system for curating a plurality of data assets includes storing, in a data storage, a plurality of source data assets, each source data asset including content data and source metadata associated with the content data; converting, based on a conversion rule defining a set of standard attributes, the plurality of source data assets to a plurality of curatable data assets, each curatable data asset including the content data of the corresponding source data asset and curatable metadata converted from the source metadata of the corresponding source data asset, the curatable metadata including one or more standard attributes; causing a user device to render a graphical user interface (GUI) configured to provide a plurality of filtering options for querying the plurality of curatable data assets, each filtering option related to at least one of the set of the standard attributes; receiving, from the user device, a curation query including a set of the filtering options selected via the GUI; and identifying, from the plurality of curatable data assets, a set of the curatable data assets satisfying the received curation query.

In another implementation, a non-transitory computer-readable medium stores executable instructions that, when executed by a processor, cause the processor to control a system to perform storing, in a data storage, a plurality of source data assets, each source data asset including content data and source metadata associated with the content data; converting, based on a conversion rule defining a set of standard attributes, the plurality of source data assets to a plurality of curatable data assets, each curatable data asset including the content data of the corresponding source data asset and curatable metadata converted from the source metadata of the corresponding source data asset, the curatable metadata including one or more standard attributes; causing a user device to render a graphical user interface (GUI) configured to provide a plurality of filtering options for querying the plurality of curatable data assets, each filtering option related to at least one of the set of the standard attributes; receiving, from the user device, a curation query including a set of the filtering options selected via the GUI; and identifying, from the plurality of curatable data assets, a set of the curatable data assets satisfying the received curation query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A, 5B, 5C and 5D show an example curation graphical user interface (GUI).

DETAILED DESCRIPTION

Figure 1:
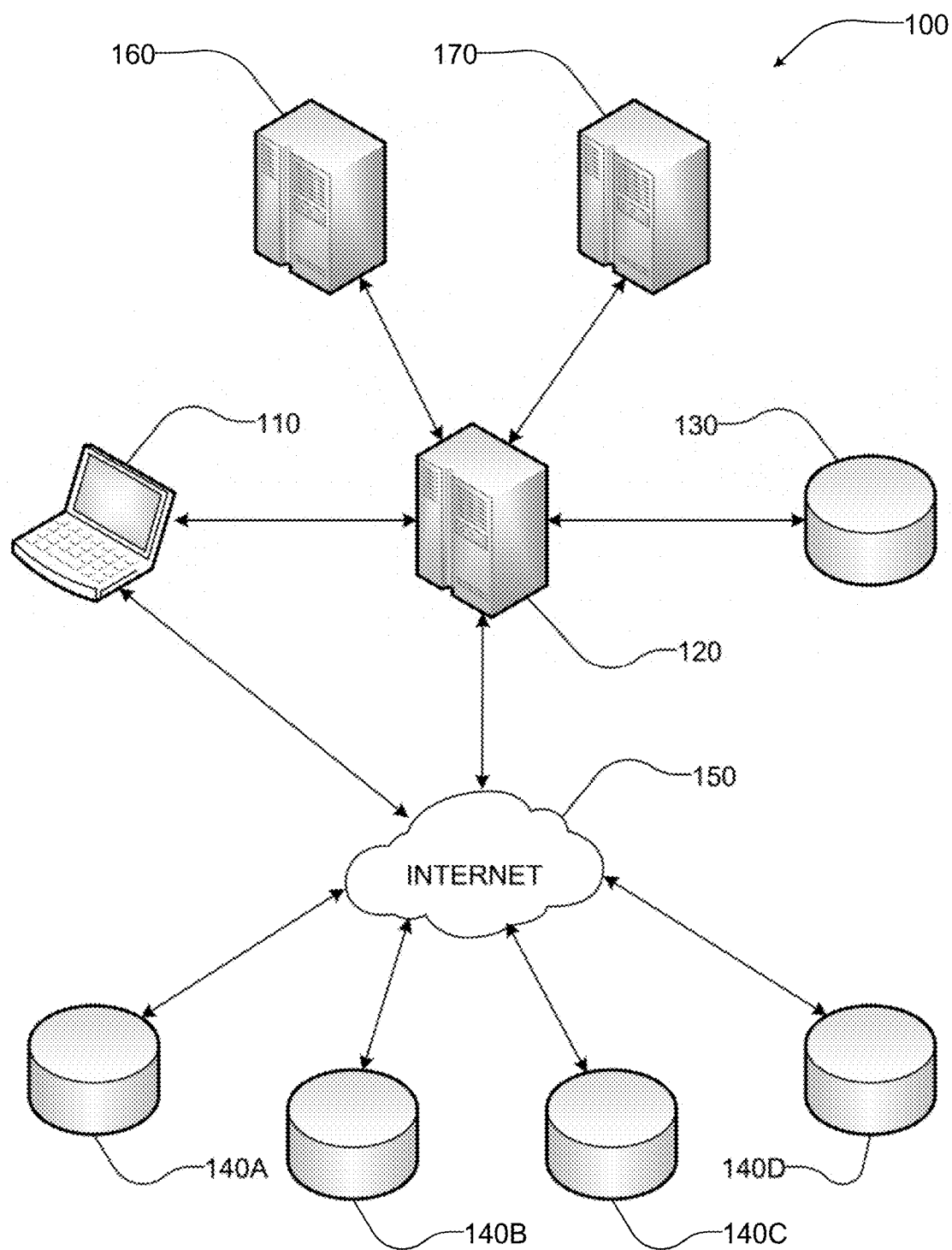
FIG. 1 illustrates an example of a system for curating content data assets.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to a technological solution to the aforementioned shortcoming in which is provided an implementation for converting, using a set of standard attributes, row content data assets (e.g., text-based content (e.g., articles, blogs, user comments, notifications, programing codes, etc.), image content (e.g., photo, PDF documents, CAD drawings, avatars, etc.), audio content (e.g., audio clips, sound effects, etc.), video content (e.g., video clips, animations, etc.), etc.) to curatable standardized content data assets, and implementing a graphical user interface (GUI) for curating the standardized content data assets to identify and undertake one or more actions on a set of the content data assets that meets a certain curation condition.

As more and more content data accumulates over an extended period of time, it becomes increasingly common that users who conduct searches or access online data sources (e.g., online knowledge bases, FAQs, archives, directory, etc.) are provided with search results that are obsolete, irrelevant or useless. There currently is no effective and efficient way of curating such large corpuses of content except for manually reviewing each content, and determining whether each is relevant, obsolete, harmful, incorrect, in need of updating or redirecting, etc., which can be burdensome, time-consuming and costly for organizations and individuals.

According to the teachings of this disclosure, by standardizing the accumulated content data assets for curation, attributes or metadata associated with each content data asset become recognizable and useable for computerized curation. Also, by configuring a GUI to provide a set of curation filtering options relevant to the standard attributes, users can create a curation query for identifying a particular set of content data assets that meets a certain curation condition. The GUI may also allow users to take one or more curation-related actions (e.g., archiving, un-indexing, updating, unlinking, repairing, optimizing, etc.) on those identified content data assets. Hence, a large corpus of raw content data can be automatically curated without involving any manual labor, thereby providing a technical solution to the time-consuming and costly technical burdens that an organization or individual faces when it has to undertake to curate a large corpus of raw content data manually.

Moreover, using the GUI, an administrator or privileged users can search and identify content data assets that are obsolete, irrelevant, incorrect or harmful, or need update or repair, and then take one or more actions on these identified content data assets. Hence, the teachings of this disclosure may reduce a significant amount of unnecessary content that could be exposed to or accessed by users seeking information. This provides a technical solution to the technical problem in which users currently are provided with a large amount of irrelevant or unnecessary content when they conduct searches or visit online content sources. Further, adequate content retirement ensures that remaining content is healthy and relevant. This will enable content owners or administrators to more efficiently spend limited resources on only valuable content.

With this overview, attention is now turned to the figures to described various implementations of the presenting teachings. FIG. 1 shows an implementation of a system 100 for curating a plurality of content data assets. The system 100 may include one or more user devices 110 (only one shown), one or more servers 120 (only one shown), one or more databases 130 (only one shown), one or more content sources (e.g., content sources 140A, 140B, 140C, 140D, etc. (collectively "content sources 140" hereinafter)), processing resources (e.g., artificial intelligent (AI) engine 160, deep learning (DL) engine 170, etc.), and/or the like.

The user device 110 is representative of any physical or virtual computing system, device, or collection thereof, such as a smart phone, laptop computer, desktop computer, hybrid computer, tablet computer, gaming machine, smart television, entertainment device, Internet appliance, virtual machine, wearable computer, as well as any variation or combination thereof. The user device 110 may operate remotely from the server 120, and hence may communicate with each other by way of data and information exchanged over a suitable communication link or links. The user device 110 may implement portions or all of the operations or functions to carry out the content data asset curation. The user device 110 may be in communication with the database 130, AI engine 160 and DL engine 170 via the server 120.

The user device 110 may include one or more internal displays and/or be connected to one or more external displays. The user device 110 may further include or be connected to one or more user interface devices, such as, a mouse, keyboard, speaker, microphone, etc. (not shown). The user device 110 may host a local curation service, which may include rendering and displaying a content data asset curation GUI (hereinafter "curation GUI"). The local curation service is representative of any software application, module, component, or collection thereof, capable of carrying out portions or all of the content data asset curation. In an implementation, the local curation service may be a part of an operating system (OS), such as Microsoft™ Windows™, Apple™ iOS™, Linux™, Google™ Chrome OS™, etc. Alternatively, the local curation service may be implemented as a locally installed and executed application, streamed application, mobile application, or any combination or variation thereof, which may be configured to carry out operations or functions related to content data asset curation. The local curation service may be implemented as a standalone application or may be distributed across multiple applications.

The server 120 is representative of any physical or virtual computing system, device, or collection thereof, such as, a web server, rack server, blade server, virtual machine server, or tower server, as well as any other type of computing system, which may be, in some scenarios, implemented in a data center, a virtual data center, or some other suitable facility. The server 120 may host a backend curation service, which may implement all or portions of the functions to carry out the content data asset curation operations or functions. The backend curation service may host, be integrated with, or be in communication with, various data sources and processing resources such as, database 130, AI engine 160, DL engine 170, etc. The backend curation service may be any software application, module, component, or collection thereof capable of providing content data asset curation to the local backend curation service. In some cases, the backend curation service is a standalone application carrying out various operations or functions related to content data asset curation.

The features and functionality provided by the local curation service and backend curation service can be co-located or even integrated as a single application. In addition to the above-mentioned features and functionality available across application and service platforms, aspects of the described content data asset curation may be carried out across multiple devices on a same or different computing devices. For example, some functionality for the visual curation query generation may be provided by the local curation service on the user device 110 and the local curation service may communicate by way of data and information exchanged between with the server 120 or other devices. As another example, the user device 110 may operate as a so-called "thin client" in a virtual computing environment and receive video data that is to be displayed via the display 112. In this virtual computing scenario, the server 120 may carry out the entire operations or functions of content data asset curation.

The system 100 may use the AI engine 160 and/or DL engine 170, etc. to provide more accurate and effective content data asset curation. The AI and DL engines 160 and 170 may be implemented based on a machine-learning (ML), which generally involves various algorithms that can automatically learn over time. The foundation of these algorithms is generally built on mathematics and statistics that can be employed to predict events, classify entities, diagnose problems, and model function approximations. As an example, a system can be trained in order to identify patterns in user activity, determine associations between various datapoints and make decisions based on the patterns and associations. Such determination may be made following the accumulation, review, and/or analysis of data from a large number of users over time, that may be configured to provide the ML algorithm (MLA) with an initial or ongoing training set.

In different implementations, a training system may be used that includes an initial ML model (which may be referred to as an "ML model trainer") configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced. The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

For example, the DL engine 170 may be provided with raw content data assets and standardized content data assets converted from the row content data assets. From the attributes or metadata of the raw and standardized content data assets, the DL engine 170 may learn which attribute of a raw content data asset corresponds to a standard attribute. Such information may then be shared with the AI engine 160 such that the system 100 can more accurately and efficiently identify and convert the raw content data assets to curatable content data assets. Also, the DL engine 170 may learn which condition or conditions are met by a specific group of content data assets and what kind of action or actions have been taken to the specific asset group, and share such information with the AI engine 160 such that the system 100 can automatically generate curation suggestions or execute appropriate curation actions.

Raw content data assets may be stored in one or more content sources 140, which may be a cloud service provider, governmental or military organization, educational institute, private business entities, individuals, etc. that are equipped with or have access to an IT infrastructure including data communication capabilities via an Internet 150 or other wired or wireless communication networks. Such raw content data assets may be imported or made available to the server 120 for carrying content data asset curation.

Figure 2:
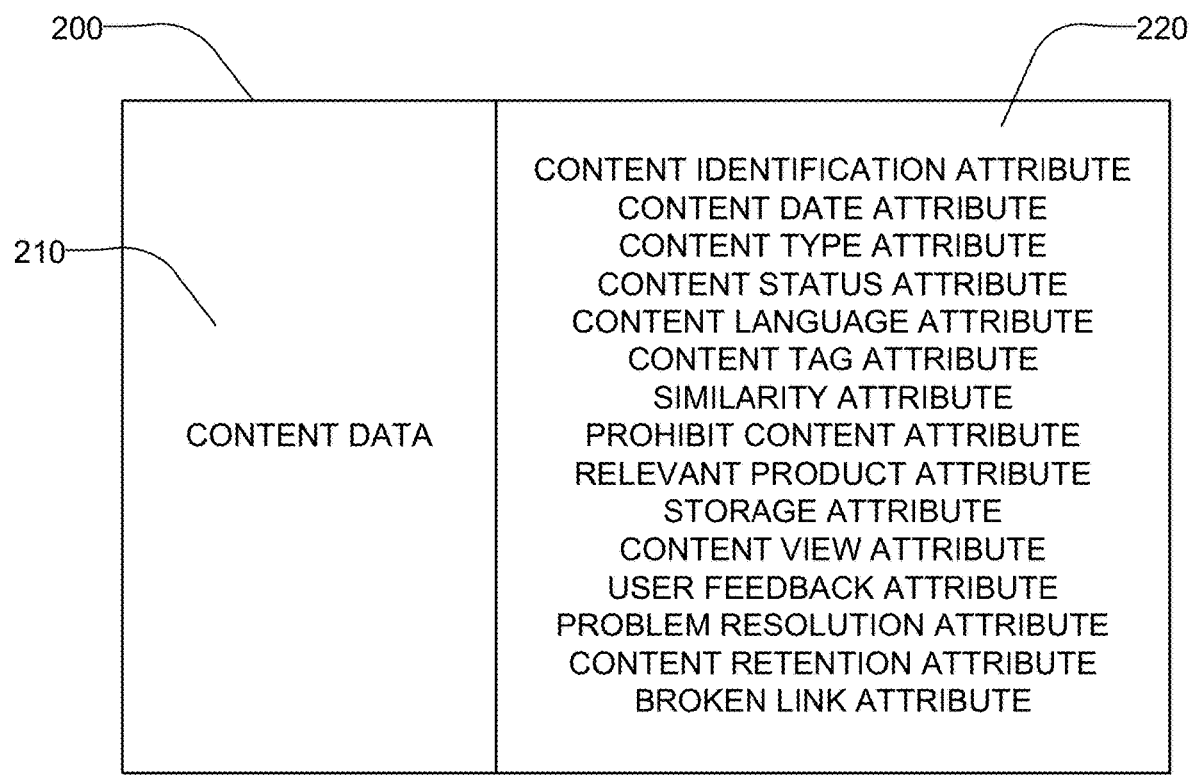
FIG. 2 shows an example construction of a content data asset.

As shown in FIG. 2, a raw content data asset 200 may include content data 210 and metadata 220 associated with the content data 210. For example, an image file may include image data and metadata associated with the image data. The metadata 220 may indicate various attributes related to content properties, content performances, and/or the like. The content property-related attributes may include, for example, a content identification attribute (e.g., content name, ID, serial number, etc.), content type attribute (e.g., text, image, audio, video, format, codec, compression format, etc.), content status attribute (e.g., published, archived, redirected, incorrect, broken, harmful, etc.) content date and time attribute (e.g., content creation date and time, content storage date and time, last modified date time, etc.), content language attribute (e.g., English, Chinese, Indian, etc.), content tag attributes (e.g., "Birthday Party," "Conference," "Remotes," "version 2.4," etc.), similarity attribute (e.g., 88% similarity to content X), prohibit content attribute (e.g., company confidential, profanity, illegal content, etc.), relevant product attribute (e.g., "Windows XP," "Windows 10," "1997 Model X," etc.), storage attributes (e.g., "ftp://ftp.domain.com/storage," "\\domain\storage," etc.), and/or the like. The content performance-related attributes may include, for example, a content view attribute (e.g., 2562 views for last 30 days, no view for one year, etc.), user feedback attribute (e.g., 354 positive user feedbacks, 37 negative user feedbacks, etc.), problem resolution attribute (e.g., a number or ratio of content resolving user inquiries, a number or ratio of user inquires related to content being escalated to a different support modality, etc.), content retention attribute (e.g., expires on 05/01/2017, expires in 5 years from creation date, etc.), broken link attribute (e.g., contains 3 broken html links, incorrectly indexed, pointing to non-existing or incorrect content, etc.), and/or the like.

Figure 3A:
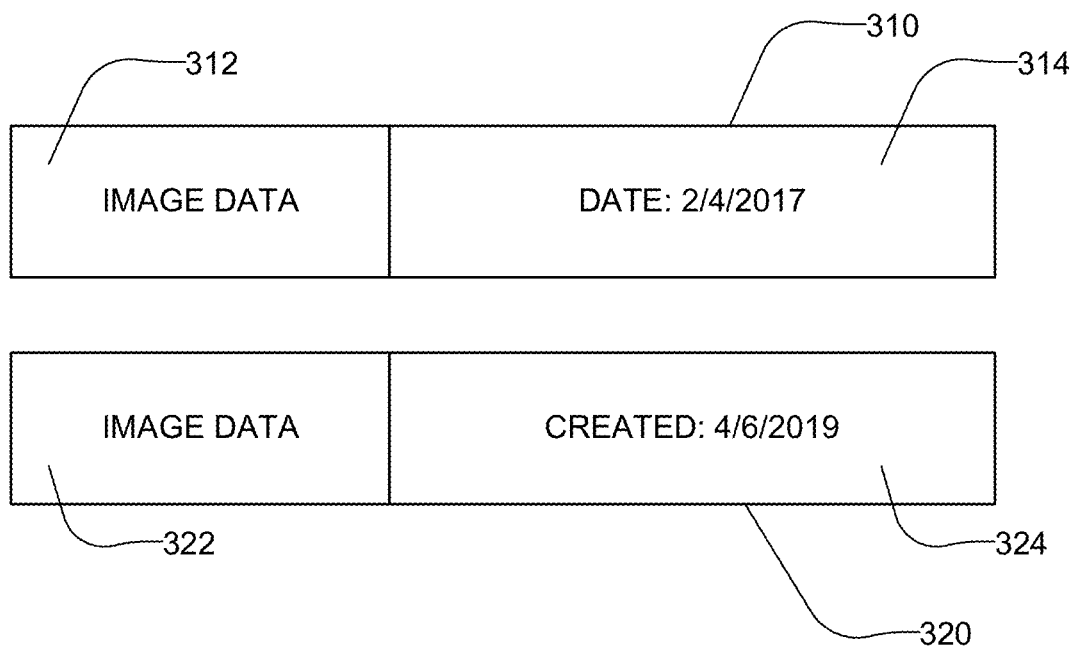
FIGS. 3A and 3B illustrate example constructions of two raw content data assets.
Figure 3B:
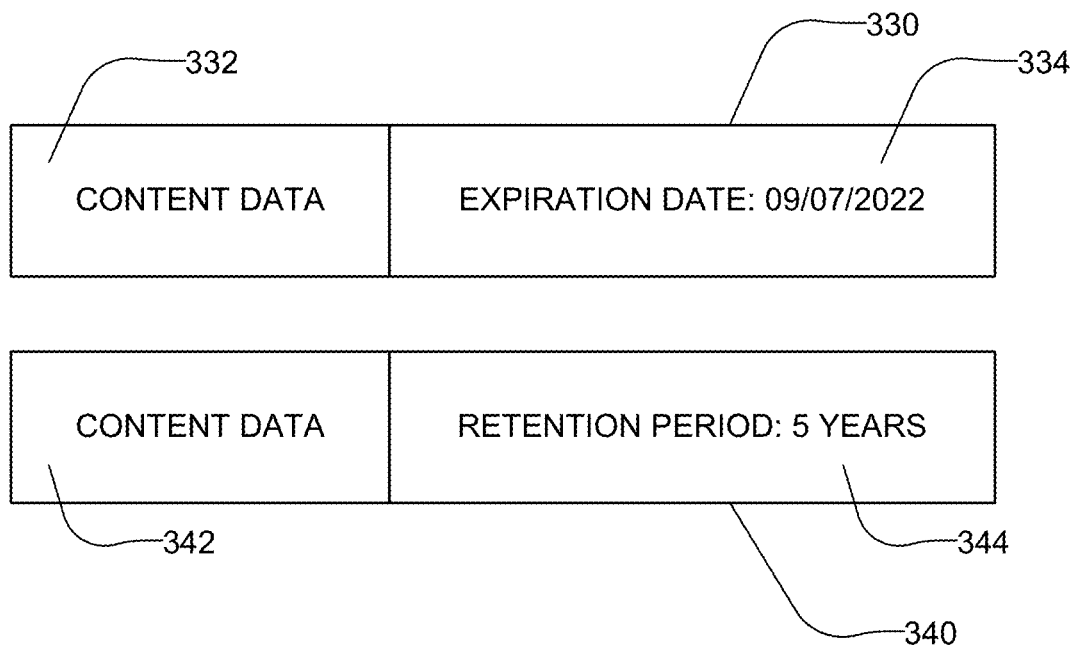

The metadata of the row content data assets may not be in a standardized format. For example, as shown in FIG. 3A, an image file 310 (e.g., a digital photo) may have image data 312 and metadata 314, which includes a content date attribute "DATE: 2/4/2017." Another image file 320 (e.g., a scanned document image) may have image data 322 and metadata 324, which includes a content date attribute "CREATED: 4/6/2019." While the content date attributes of the image files 310 and 320 indicate the same attribute type, different words (e.g., "DATE" and "CREATED") are used. Also, as shown in FIG. 3B, a content data asset 330 may have content data 332 and metadata 334, which includes a content retention attribute "EXPIRATION DATE: 09/07/2022," which specifies a retention expiration date. Another content data asset 340 may have content data 342 and metadata 344, which includes a content retention attribute "RETENTION PERIOD: 5 YEARS," which specifies a retention period. Such inconstancy and irregularity in the metadata makes it difficult or impossible to computerize and automate content data asset curation, providing no options but performing time-consuming and costly manual labor.

Figure 4A:
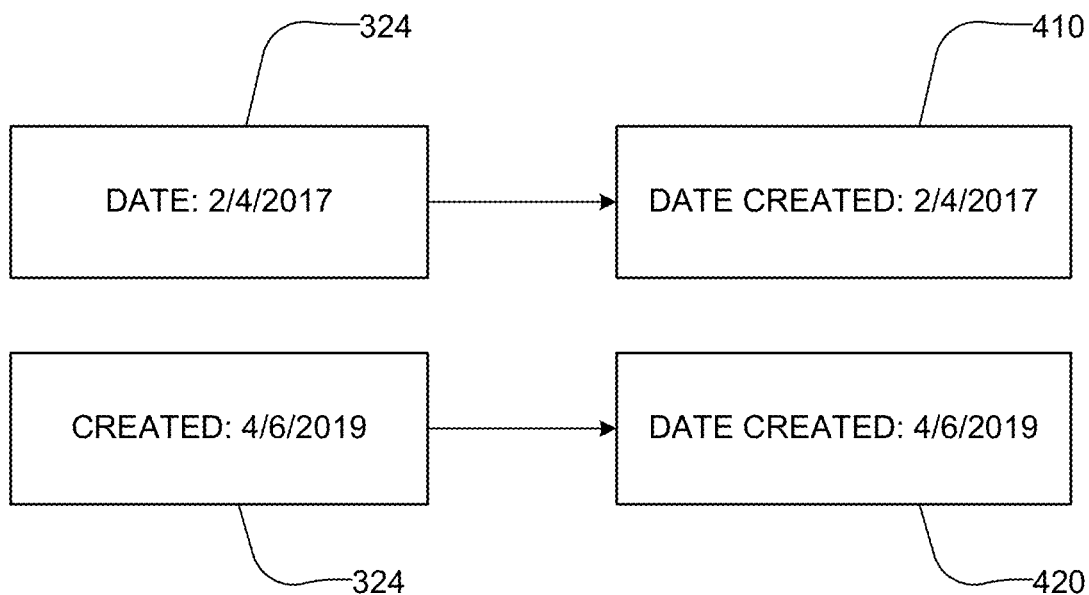
FIGS. 4A and 4B show an example of converting metadata of row content data assets to curatable metadata.

To solve the technical problems caused by such inconstancy and irregularity in the metadata, the server 120 may convert the metadata of raw content data assets to curatable metadata based on a conversion rule defining a set of standard attributes. The set of standard attributes may include a content identification-related attribute, content type-related attribute, content date-related attribute, content status-related attribute, content view-related attribute, content language-related attribute, content tag-related attribute, user feedback-related attribute, problem resolution attribute, content retention-related attribute, broken link-related attribute, similarity-related attribute, prohibited content-related attribute, relevant product-related attribute, storage location-related attribute, and/or the like. For example, as shown in FIG. 4A, the content date attribute name "DATE" in the metadata 314 of the content data asset 310 may be converted to a standard attribute name "DATE CREATED" according to the conversion rule. By such conversion of the metadata 324, the content data asset 310 may be converted to a curable data asset including converted metadata 410. The content data of the source content data asset 310 may not be altered during the conversion. However, the meta 410 of the curable data asset may include a set of standard attributes that is curatable. Similarly, the content date attribute name "CREATED" of the metadata 324 of the content data asset 320 may be converted to the standard attribute name "DATE CREATED," which may result in converting the content data asset 320 to a curable data asset.

The conversion rule may not be limited to replacement of wordings or formats.

Figure 4B:
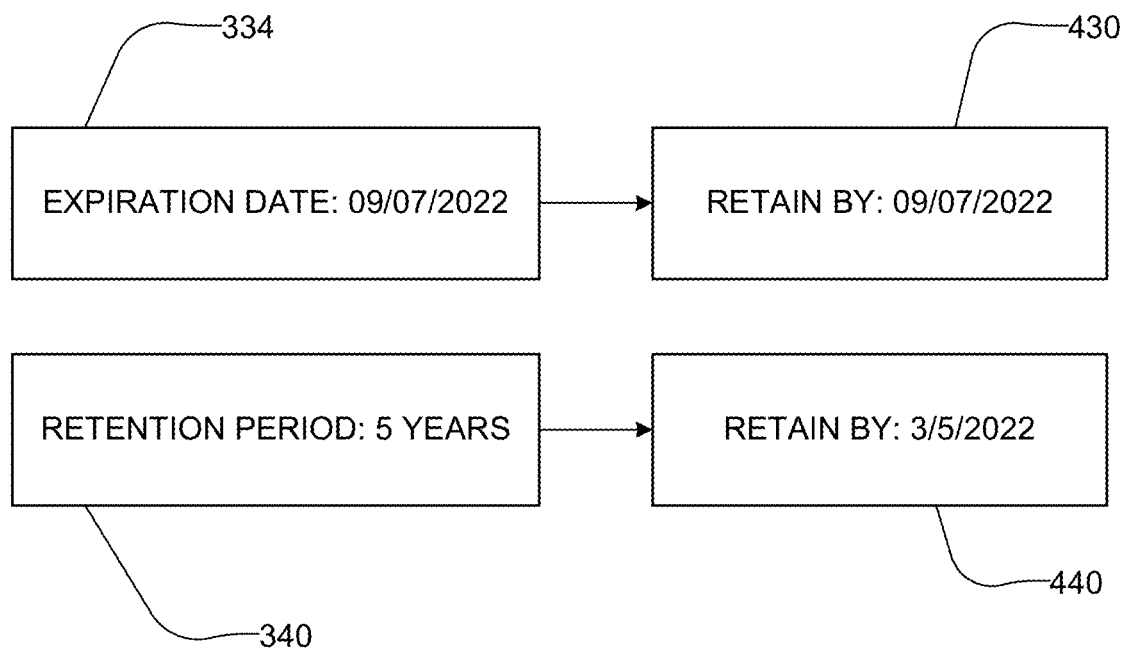

According to the conversion rule, the server 120 may identify similar attributes that are expressed in different formats, data types, etc. in various raw content data assets, and standardize these similar attributes using a standard attribute set by the conversion rule. For example, as shown in FIG. 4B, the server 120 may convert the retention attribute "Expiration date: 09/07/2022" of the metadata 334 to a curable retention attribute "Retain by: 09/07/2022," using the standard attribute name "Retain by" set by the conversion rule. The system 100 may also convert the retention attribute "Retention period: 5 years" to the standard retention attribute "Retain by: 3/5/2022" by searching a content date attribute (e.g., "Date Created: 3/5/2017"), identifying a content creation date ("3/5/2017") from the content data attribute and calculating the fifth year date from the content creation date. By performing such conversion, the server 120 may convert the metadata 334 and 340 to curatable metadata 430 and 440, respectively, which include the same standard attribute type (e.g., "Retain by"). This may result in converting the row content data assets 310 and 320 to curable data assets. The system 100 may add or store the converted content data assets the database 130.

Figure 5A:

By performing such conversion on the raw content data assets, the system 100 may allow a user to curate the entire corpus of the raw content data assets. For example, the server 120 may cause the user device 110 to render and display a GUI configured to allow users to curate the converted data assets. For example, FIGS. 5A, 5B, 5C and 5D illustrate various features and functions of a curation GUI 500, which may be rendered and displayed at the user device 110. In FIG. 5A, the curation GUI 500 may be configured to provide options for selecting a storage location where curatable content data assets (e.g., source files location 502) are located and another storage location where the content data assets that are set to be archived (e.g., archived files locations 504) should be stored. The curation GUI 500 may also allow a user to name a curation configuration (e.g., curation configuration name 506), save the curation configuration in a specific storage location, retrieve an existing curation configuration from a specific storage location, and modify the existing curation configuration.

The curation GUI 500 may be configured to allow a user to create a curation query by stringing one or more attribute parameters. The curation GUI 500 may be configured to provide a plurality of filtering options for querying the plurality of curatable data assets. The filtering options may include a content type-related option, content date-related option, content age-related option, content status-related option, content view-related option, content language-related option, content tag-related option, user feedback-related option, problem resolution-related option, content retention-related option, broken link-related option, similarity score-related option, prohibited content score-related option, relevant product-related option, storage location-related option, and/or the like. Each filtering option may be related to at least one of the set of the standard attributes. For example, the content date-related option may include a "content age (month)" option that is related to the standard content date-related attribute. The content view-related option may include a "page view (90 days)" option, which may be related to the standard content view-related attribute.

Figure 5B:
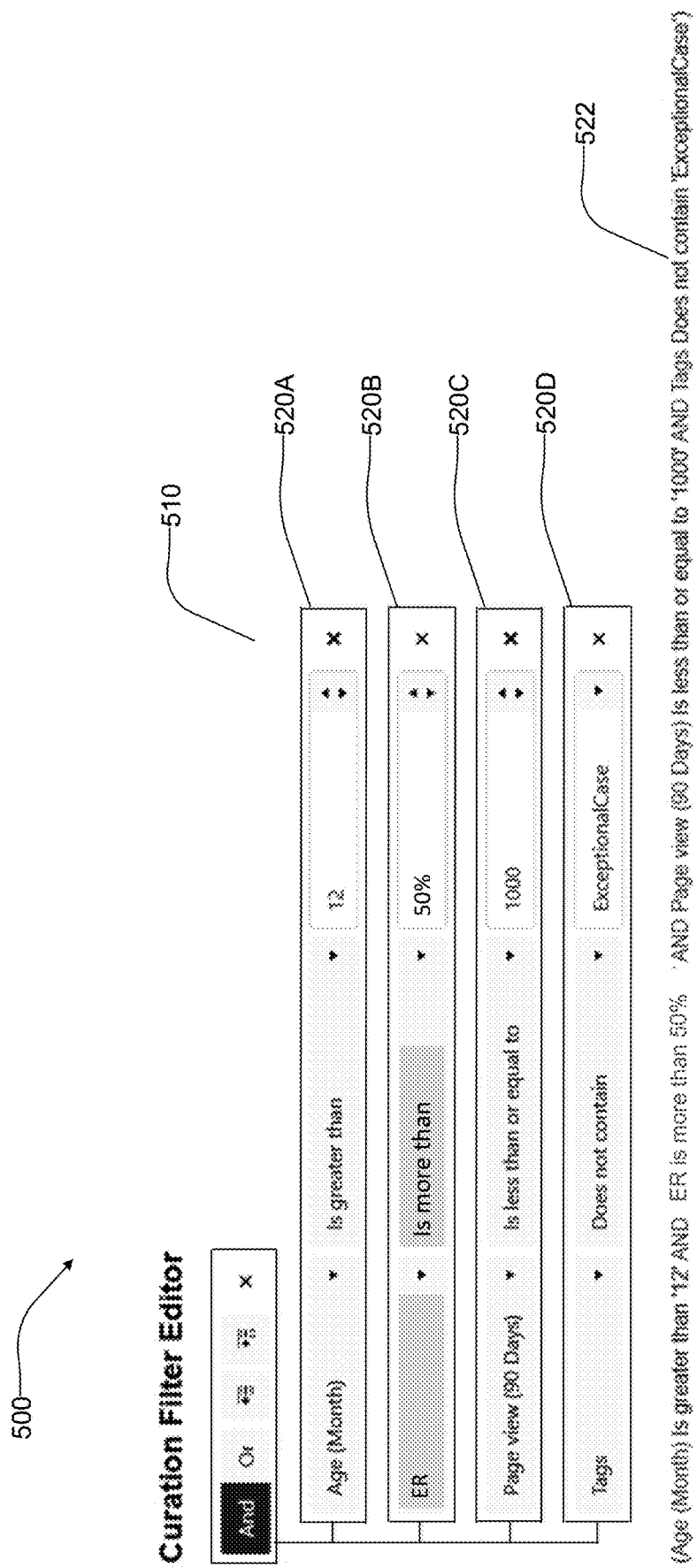

For example, as shown in FIG. 5B, the curation GUI 500 may include a curation filter editor 510, which may allow a user to create a curation query by, for example, stringing two or more filtering options using one or more operators, such as "AND," "OR," etc. For example, a user may want to filter the content data assets that are older than one year. A user may then create a first filtering option 520A by selecting a filtering type "Age (Month)," select a relation option "is greater than," and then select or enter a value "12." The user may want to refine the query by adding another filtering option to query the content data assets that have a more than 50% escalation rate (ER), which is a rate of user inquires related to a particular content asset being escalated to a different support modality (e.g., a chat or voice call with a customer service agent, etc.). The user may then select the "AND" operator and then select a filtering type "ER," select a relation option "is more than," and then select or type a value "50%," which creates the second filtering option 520B. The user may further refine the query by adding additional filtering options and selecting one or more operators. For example, the user may want to further filter the content data assets that has less or equal to 1000 views for the last 90 days. The user may then select the "AND" operator and then select a filtering type "Page view (90 days)", a relation option "is less than or equal to," and a value "1000," which creates the third filtering option 520C.

When a curation query is made based on the first, second and third filtering options 502A, 502B and 520C stringed together via the "AND" operator, the query result may include content data assets that should not be altered regardless of their age, escalation rate and page views. To exclude those content data assets, the user may select the "AND" operator and add another filtering option 520D by, for example, selecting a filtering type "Tag" and a relation option "does not contain," and then selecting or typing a predetermined tag value (e.g., "ExceptionalCase"). By adding the fourth filtering option to the search query, the content data assets that contain "ExceptionalCase" in the content tag-related attribute may be excluded from the query result. The curation GUI 500 may be configured to show a curation query 522 including the filtering options and operators selected by the user. As such, the curation GUI 500 may allow user to create a curation query by stringing one or more filtering options and defining operational relationship between the filtering options, which may allow to surgically query the content data assets in any possible way.

Upon receiving the curation query 522, the server 120 may query the database 130 to identify the content data assets that satisfy the curation query and provide, to the user device 110, a query result, which may include a list of the content data assets that satisfy the curation query. The user device 110 may then display such list via the curation GUI 500. An example of such list is shown as a list 530 in FIG. 5C. The GUI 500 may provide options to include or exclude the content data assets individually or entirely when a curation-related action or actions are taken. For example, when a number of content data assets are queried for un-indexing, a user may find the list 530 includes one or more content data assets that should not be un-indexed. The user may then exclude these content data assets individually by unchecking a box 532 associated with these content data assets.

Figure 5C:
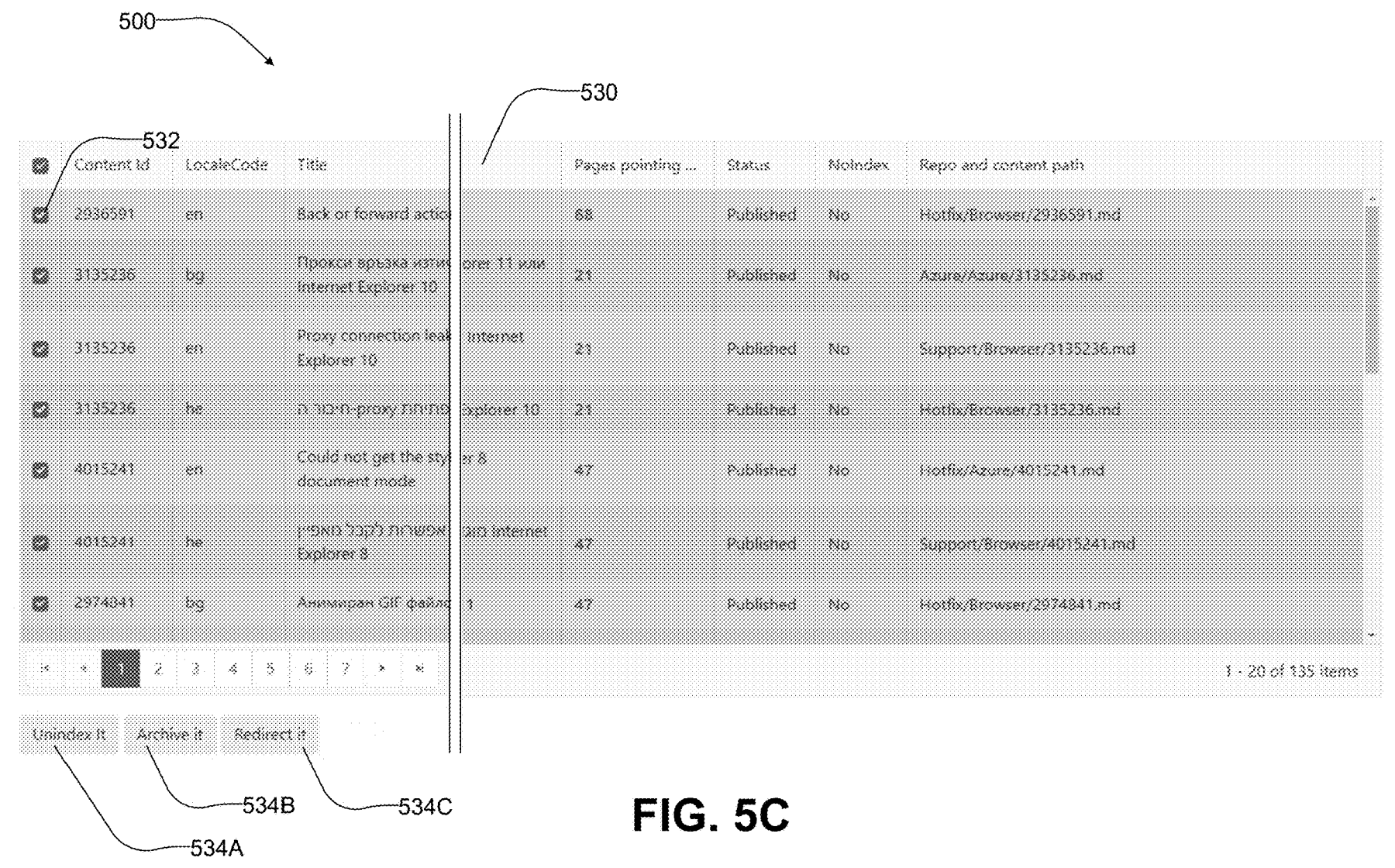

The curation GUI 500 may be further configured to receive a user input requesting to take one or more curation-related actions. For example, as shown in FIG. 5C, the curation GUI 500 may include a plurality of buttons for activating curation actions, for example, an "Unindex it" button 534A, "Archive it" button 534B and "Redirect it" button 534C, etc. Upon receiving the user input, the server 120 may perform the requested curation related action. For example, when the user clicks the "Unindex it" button 534, the server 120 may unindex the content data assets included in the list 530 such that these assets are unindexed and therefore cannot be accessible. When the "Archive it" button 534B is clicked, the server 120 may archive the content data assets such that these assets are still accessible when the exact location or address is known but cannot be found from searches. Hence, the system 100 may identify and retire obsolete and irrelevant content data assets such that these assets do not show up in user-conducted searches or content browsing sessions. Also, the system 100 may eliminate or reduce a need to involve intense, time-consuming and costly manual labors for content curation. Hence, organizations and individuals may no longer be deterred from curating a large volume of content data assets.

Figure 5D:
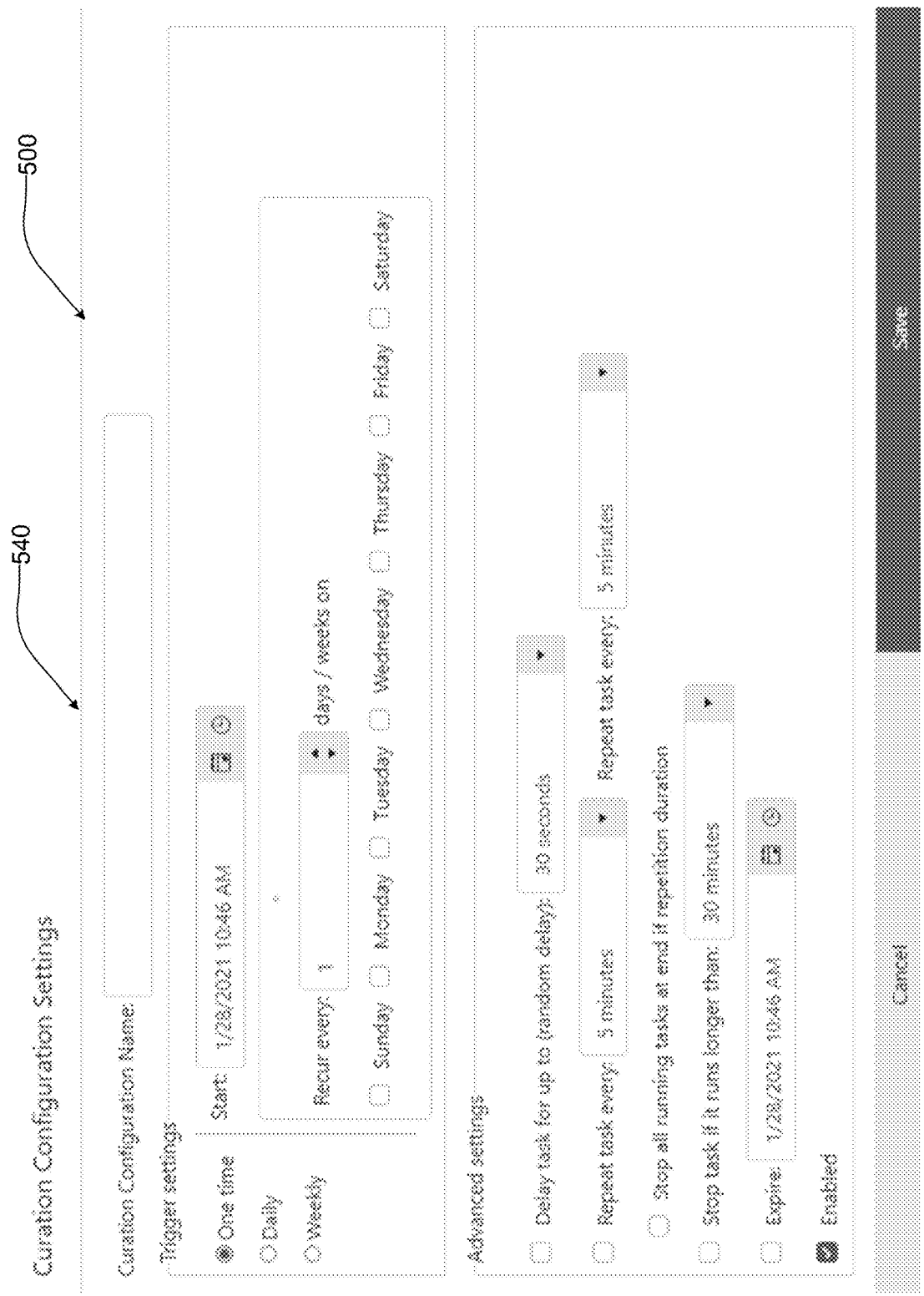

The system 100 may allow users to configure curation settings. For example, as shown in FIG. 5D, the curation GUI 500 may be configured to provide a curation configuration setting GUI 540, which may allow users to set various settings, for example, triggering settings for automatically carrying out a predetermined curation query and action based on a schedule specified by users. For example, the GUI 540 may allow users to schedule a task for carrying out a curation query and/or action regularly (e.g., once per day or week) or at a specific date and time. Also, the GUI 540 may also allow users to set an allowable delay time and allowable repeat times for initiating the task, and to set the task to be stopped when the task takes longer than a user-defined time. Such settings may be saved for a later use. As such, the system 100 may automatically execute curation queries and actions without any involvement from users.

Figure 6:
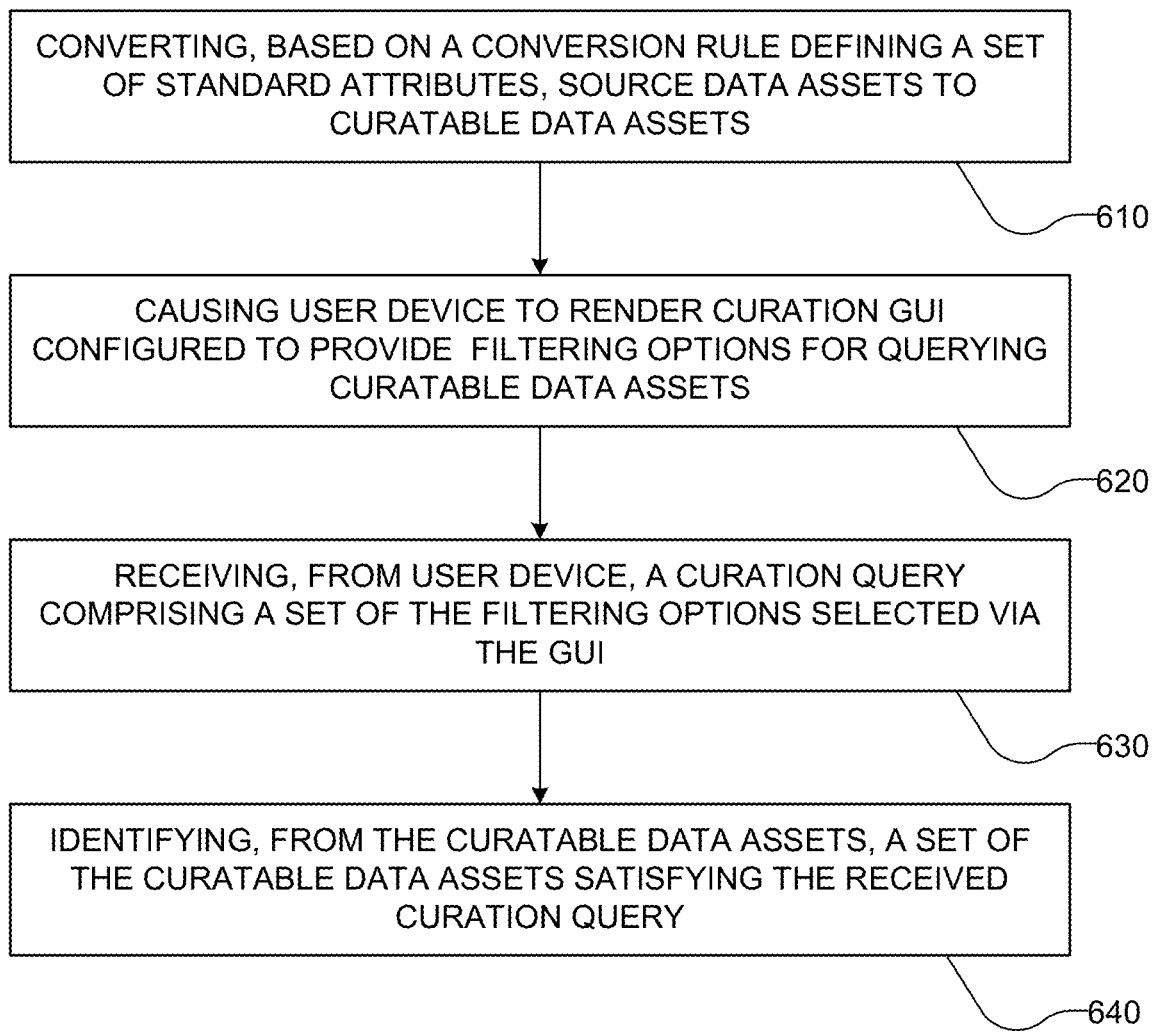
FIG. 6 is a flow diagram showing an example process for curating a plurality of source data assets.

FIG. 6 is a flow diagram showing a process for operating the system 100 for content data asset curation. The system 100 may store, for example, in the database 130, a plurality of source data assets. Each source data asset may include content data and source metadata associated with the content data.

At step 610, the server 120 may convert, based on a conversion rule defining a set of standard attributes, the plurality of source data assets to a plurality of curatable data assets. Each curatable data asset may include the content data of the corresponding source data asset, and curatable metadata converted from the source metadata of the corresponding source data asset. The curatable metadata may include one or more standard attributes. At step 620, the server 120 may cause the user device 110 to render a curation GUI (e.g., GUI 500) configured to provide a plurality of filtering options for querying the plurality of curatable data assets. Each filtering option may be related to at least one of the set of the standard attributes. At step 630, the server 120 may receive, from the user device 110, a curation query comprising a set of the filtering options selected via the GUI 500. At step 640, the server 120 may identify, from the plurality of curatable data assets, a set of the curatable data assets satisfying the received curation query.

Figure 7:
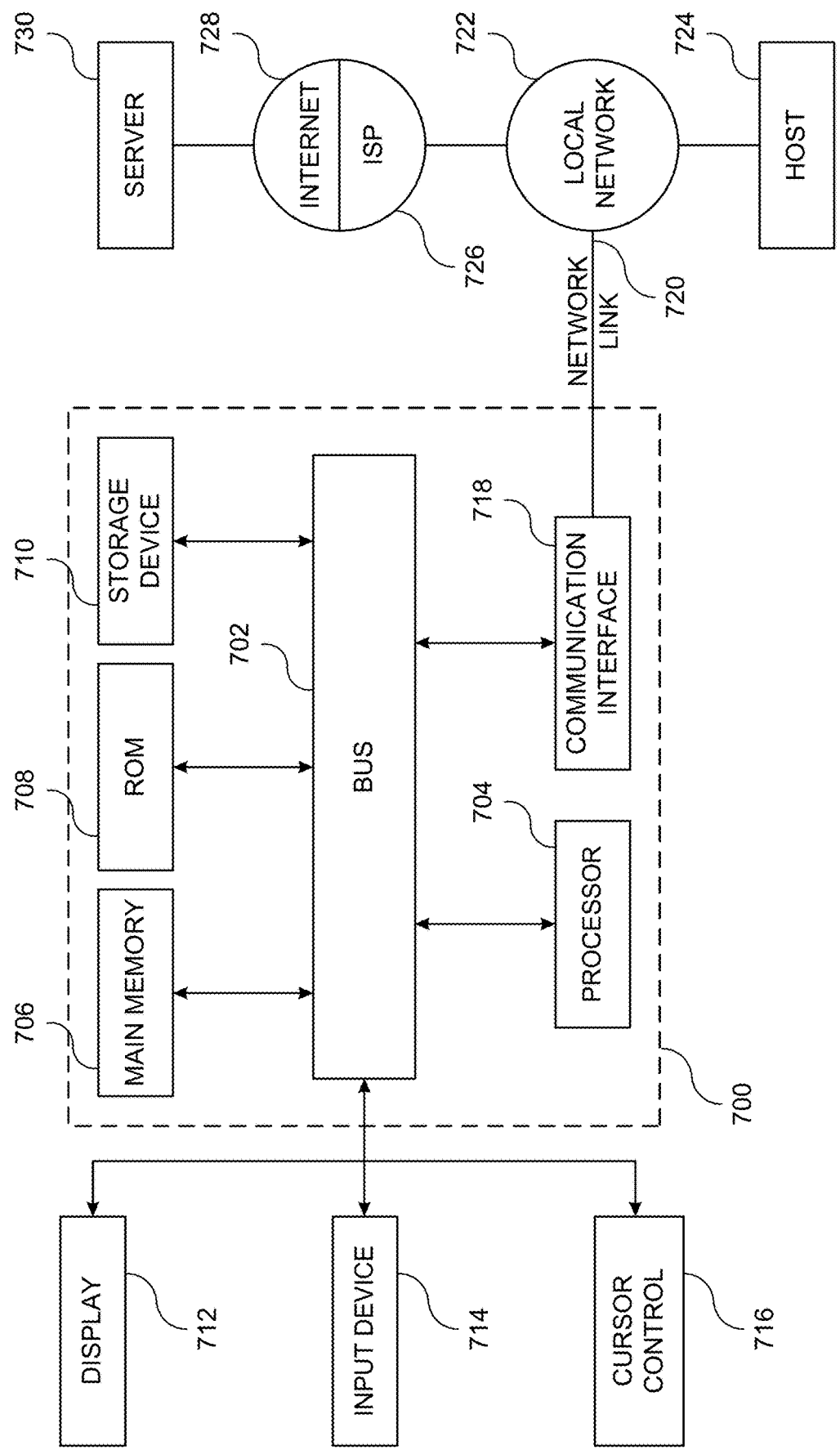
FIG. 7 is a block diagram showing an example computer system upon which aspects of this disclosure may be implemented.

FIG. 7 is a block diagram showing an example a computer system 700 upon which aspects of this disclosure may be implemented. The computer system 700 may include a bus 702 or other communication mechanism for communicating information, and a processor 704 coupled with the bus 702 for processing information. The computer system 700 may also include a main memory 706, such as a random-access memory (RAM) or other dynamic storage device, coupled to the bus 702 for storing information and instructions to be executed by the processor 704. The main memory 706 may also be used for storing temporary variables or other intermediate information during execution of instructions to be executed by the processor 704. The computer system 700 may implement, for example, the user device 110 and server 120.

The computer system 700 may further include a read only memory (ROM) 708 or other static storage device coupled to the bus 702 for storing static information and instructions for the processor 704. A storage device 710, such as a flash or other non-volatile memory may be coupled to the bus 702 for storing information and instructions.

The computer system 700 may be coupled via the bus 702 to a display 712, such as a liquid crystal display (LCD), for displaying information. One or more user input devices, such as the example user input device 714, may be coupled to the bus 702, and may be configured for receiving various user inputs, such as user command selections and communicating these to the processor 704, or to the main memory 706. The user input device 714 may include physical structure, or virtual implementation, or both, providing user input modes or options, for controlling, for example, a cursor, visible to a user through display 712 or through other techniques, and such modes or operations may include, for example virtual mouse, trackball, or cursor direction keys.

The computer system 700 may include respective resources of the processor 704 executing, in an overlapping or interleaved manner, respective program instructions. Instructions may be read into the main memory 706 from another machine-readable medium, such as the storage device 710. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 710. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 700 may also include a communication interface 718 coupled to the bus 702, for two-way data communication coupling to a network link 720 connected to a local network 722. The network link 720 may provide data communication through one or more networks to other data devices. For example, the network link 720 may provide a connection through the local network 722 to a host computer 724 or to data equipment operated by an Internet Service Provider (ISP) 726 to access through the Internet 728 a server 730, for example, to obtain code for an application program.

In the following, further features, characteristics and advantages of the invention will be described by means of items:

Item 1. A system for curating a plurality of data assets, comprising a data storage storing a plurality of source data assets, each source data asset comprising content data and source metadata associated with the content data; a processor; and a computer-readable medium in communication with the processor and storing instructions that, when executed by the processor, cause the processor to control the system to perform: converting, based on a conversion rule defining a set of standard attributes, the plurality of source data assets to a plurality of curatable data assets, each curatable data asset comprising: the content data of the corresponding source data asset; and curatable metadata converted from the source metadata of the corresponding source data asset, the curatable metadata comprising one or more standard attributes; causing a user device to render a graphical user interface (GUI) configured to provide a plurality of filtering options for querying the plurality of curatable data assets, each filtering option related to at least one of the set of the standard attributes; receiving, from the user device, a curation query comprising a set of the filtering options selected via the GUI; and identifying, from the plurality of curatable data assets, a set of the curatable data assets satisfying the received curation query.

Item 2. The system of Item 1, wherein the instructions, when executed by the processor, further cause the processor to control the system to perform causing the user device to display, via the GUI, a list of the identified set of the curatable data assets.

Item 3. The system of Item 1, wherein the plurality of source data assets comprises at least one of a text-based file, image file, audio file and video file.

Item 4. The system of Item 1, wherein the set of standard attributes includes at least one of content identification-related attribute, content type-related attribute, content date-related attribute, content status-related attribute, content view-related attribute, content language-related attribute, content tag-related attribute, user feedback-related attribute, problem resolution attribute, content retention-related attribute, broken link-related attribute, similarity-related attribute, prohibited content-related attribute, relevant product-related attribute and storage location-related attribute.

Item 5. The system of Item 1, wherein the set of filtering options comprises at least one of a content type-related option, content date-related option, content age-related option, content status-related option, content view-related option, content language-related option, content tag-related option, user feedback-related option, problem resolution-related option, content retention-related option, broken link-related option, similarity score-related option, prohibited content score-related option, relevant product-related option and storage location-related option.

Item 6. The system of Item 1, wherein the GUI is further configured to allow a user to create the curation query by stringing two or more filtering options using one or more operators.

Item 7. The system of Item 1, wherein the GUI is further configured to allow a user to define each filtering option by entering a value for each filtering option and selecting a relational operator defining a relationship between the filtering option and the entered value.

Item 8. The system of Item 1, wherein the instructions, when executed by the processor, further cause the processor to control the system to perform receiving a user input requesting to execute a curation action on the identified set of the curatable data assets; and executing the requested curation action on the identified set of the curatable data assets.

Item 9. The system of Item 8, wherein the curation action comprises at least one of archiving the identified set of the curatable data assets; unindexing the identified set of the curatable data assets; and redirecting the identified set of the curatable data assets.

Item 10. A method of operating a system for curating a plurality of data assets, comprising: storing, in a data storage, a plurality of source data assets, each source data asset comprising content data and source metadata associated with the content data; converting, based on a conversion rule defining a set of standard attributes, the plurality of source data assets to a plurality of curatable data assets, each curatable data asset comprising: the content data of the corresponding source data asset; and curatable metadata converted from the source metadata of the corresponding source data asset, the curatable metadata comprising one or more standard attributes; causing a user device to render a graphical user interface (GUI) configured to provide a plurality of filtering options for querying the plurality of curatable data assets, each filtering option related to at least one of the set of the standard attributes; receiving, from the user device, a curation query comprising a set of the filtering options selected via the GUI; and identifying, from the plurality of curatable data assets, a set of the curatable data assets satisfying the received curation query.

Item 11. The method of Item 10, further comprising causing the user device to display, via the GUI, a list of the identified set of the curatable data assets.

Item 12. The method of Item 10, wherein the plurality of source data assets comprises at least one of a text-based file, image file, audio file and video file.

Item 13. The method of Item 10, wherein the set of standard attributes includes at least one of content identification-related attribute, content type-related attribute, content date-related attribute, content status-related attribute, content view-related attribute, content language-related attribute, content tag-related attribute, user feedback-related attribute, problem resolution attribute, content retention-related attribute, broken link-related attribute, similarity-related attribute, prohibited content-related attribute, relevant product-related attribute and storage location-related attribute.

Item 14. The method of Item 10, wherein the set of filtering options comprises at least one of a content type-related option, content date-related option, content age-related option, content status-related option, content view-related option, content language-related option, content tag-related option, user feedback-related option, problem resolution-related option, retention-related option, broken link-related option, similarity score-related option, prohibited content score-related option, relevant product-related option and storage location-related option.

Item 15. The method of Item 10, wherein the GUI is further configured to allow a user to create the curation query by stringing two or more filtering options using one or more operators.

Item 16. The method of Item 10, wherein the GUI is further configured to allow a user to define each filtering option by entering a value for each filtering option and selecting a relational operator defining a relationship between the filtering option and the entered value.

Item 17. The method of Item 10, further comprising receiving a user input requesting to execute a curation action on the identified set of the curatable data assets; and executing the requested curation action on the identified set of the curatable data assets.

Item 18. The method of Item 10, wherein the curation action comprises at least one of archiving the identified set of the curatable data assets; un-indexing the identified set of the curatable data assets; and redirecting the identified set of the curatable data assets.

Item 19. A non-transitory computer-readable medium storing executable instructions that, when executed by a processor, cause the processor to control a system to perform storing, in a data storage, a plurality of source data assets, each source data asset comprising content data and source metadata associated with the content data; converting, based on a conversion rule defining a set of standard attributes, the plurality of source data assets to a plurality of curatable data assets, each curatable data asset comprising the content data of the corresponding source data asset; and curatable metadata converted from the source metadata of the corresponding source data asset, the curatable metadata comprising one or more standard attributes; causing a user device to render a graphical user interface (GUI) configured to provide a plurality of filtering options for querying the plurality of curatable data assets, each filtering option related to at least one of the set of the standard attributes; receiving, from the user device, a curation query comprising a set of the filtering options selected via the GUI; and identifying, from the plurality of curatable data assets, a set of the curatable data assets satisfying the received curation query.

Item 20. The non-transitory computer-readable medium of Item 19, wherein the instructions, when executed by the processor, further cause the processor to control the system to perform receiving a user input requesting to execute a curation action on the identified set of the curatable data assets; and executing the requested curation action on the identified set of the curatable data assets.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached Items and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for curating a plurality of data assets, comprising:
    a data storage storing a plurality of source data assets, each source data asset comprising content data and source metadata associated with the content data;
    a processor; and
    a non-transitory computer-readable medium in communication with the processor and storing instructions that, when executed by the processor, cause the processor to control the system to perform:
        converting, based on a conversion rule defining a set of standard attributes, the plurality of source data assets to a plurality of curatable data assets, each curatable data asset comprising:
            the content data of the corresponding source data asset; and
            curatable metadata converted from the source metadata of the corresponding source data asset, the curatable metadata comprising one or more standard attributes;
        causing a user device to render a graphical user interface (GUI) configured to provide a plurality of filtering options for querying the plurality of curatable data assets, each filtering option related to at least one of the set of the standard attributes;
        receiving, from the user device, a curation query comprising a set of the filtering options selected via the GUI; and
        identifying, from the plurality of curatable data assets, a set of the curatable data assets satisfying the received curation query.

2. The system of claim 1, wherein the instructions, when executed by the processor, further cause the processor to control the system to perform causing the user device to display, via the GUI, a list of the identified set of the curatable data assets.

3. The system of claim 1, wherein the plurality of source data assets comprises at least one of a text-based file, image file, audio file and video file.

4. The system of claim 1, wherein the set of standard attributes includes at least one of content identification-related attribute, content type-related attribute, content date-related attribute, content status-related attribute, content view-related attribute, content language-related attribute, content tag-related attribute, user feedback-related attribute, problem resolution attribute, content retention-related attribute, broken link-related attribute, similarity-related attribute, prohibited content-related attribute, relevant product-related attribute and storage location-related attribute.

5. The system of claim 1, wherein the set of filtering options comprises at least one of a content type-related option, content date-related option, content age-related option, content status-related option, content view-related option, content language-related option, content tag-related option, user feedback-related option, problem resolution-related option, content retention-related option, broken link-related option, similarity score-related option, prohibited content score-related option, relevant product-related option and storage location-related option.

6. The system of claim 1, wherein the GUI is further configured to allow a user to create the curation query by stringing two or more filtering options using one or more operators.

7. The system of claim 1, wherein the GUI is further configured to allow a user to define each filtering option by entering a value for each filtering option and selecting a relational operator defining a relationship between the filtering option and the entered value.

8. The system of claim 1, wherein the instructions, when executed by the processor, further cause the processor to control the system to perform:
    receiving a user input requesting to execute a curation action on the identified set of the curatable data assets; and
    executing the requested curation action on the identified set of the curatable data assets.

9. The system of claim 8, wherein the curation action comprises at least one of:
    archiving the identified set of the curatable data assets;
    unindexing the identified set of the curatable data assets; and
    redirecting the identified set of the curatable data assets.

10. A method of operating a system for curating a plurality of data assets, comprising:
    storing, in a data storage, a plurality of source data assets, each source data asset comprising content data and source metadata associated with the content data;
    converting, based on a conversion rule defining a set of standard attributes, the plurality of source data assets to a plurality of curatable data assets, each curatable data asset comprising:
        the content data of the corresponding source data asset; and
        curatable metadata converted from the source metadata of the corresponding source data asset, the curatable metadata comprising one or more standard attributes;
    causing a user device to render a graphical user interface (GUI) configured to provide a plurality of filtering options for querying the plurality of curatable data assets, each filtering option related to at least one of the set of the standard attributes;
    receiving, from the user device, a curation query comprising a set of the filtering options selected via the GUI; and
    identifying, from the plurality of curatable data assets, a set of the curatable data assets satisfying the received curation query.

11. The method of claim 10, further comprising causing the user device to display, via the GUI, a list of the identified set of the curatable data assets.

12. The method of claim 10, wherein the plurality of source data assets comprises at least one of a text-based file, image file, audio file and video file.

13. The method of claim 10, wherein the set of standard attributes includes at least one of content identification-related attribute, content type-related attribute, content date-related attribute, content status-related attribute, content view-related attribute, content language-related attribute, content tag-related attribute, user feedback-related attribute, problem resolution attribute, content retention-related attribute, broken link-related attribute, similarity-related attribute, prohibited content-related attribute, relevant product-related attribute and storage location-related attribute.

14. The method of claim 10, wherein the set of filtering options comprises at least one of a content type-related option, content date-related option, content age-related option, content status-related option, content view-related option, content language-related option, content tag-related option, user feedback-related option, problem resolution-related option, retention-related option, broken link-related option, similarity score-related option, prohibited content score-related option, relevant product-related option and storage location-related option.

15. The method of claim 10, wherein the GUI is further configured to allow a user to create the curation query by stringing two or more filtering options using one or more operators.

16. The method of claim 10, wherein the GUI is further configured to allow a user to define each filtering option by entering a value for each filtering option and selecting a relational operator defining a relationship between the filtering option and the entered value.

17. The method of claim 10, further comprising:
receiving a user input requesting to execute a curation action on the identified set of the curatable data assets; and
executing the requested curation action on the identified set of the curatable data assets.

18. The method of claim 10, wherein the curation action comprises at least one of:
archiving the identified set of the curatable data assets;
un-indexing the identified set of the curatable data assets; and
redirecting the identified set of the curatable data assets.

19. A non-transitory computer-readable medium storing executable instructions that, when executed by a processor, cause the processor to control a system to perform:
storing, in a data storage, a plurality of source data assets, each source data asset comprising content data and source metadata associated with the content data;
converting, based on a conversion rule defining a set of standard attributes, the plurality of source data assets to a plurality of curatable data assets, each curatable data asset comprising:
the content data of the corresponding source data asset; and
curatable metadata converted from the source metadata of the corresponding source data asset, the curatable metadata comprising one or more standard attributes;
causing a user device to render a graphical user interface (GUI) configured to provide a plurality of filtering options for querying the plurality of curatable data assets, each filtering option related to at least one of the set of the standard attributes;
receiving, from the user device, a curation query comprising a set of the filtering options selected via the GUI; and
identifying, from the plurality of curatable data assets, a set of the curatable data assets satisfying the received curation query.

20. The non-transitory computer-readable medium of claim 19, wherein the instructions, when executed by the processor, further cause the processor to control the system to perform:
receiving a user input requesting to execute a curation action on the identified set of the curatable data assets; and
executing the requested curation action on the identified set of the curatable data assets.

* * * * *